(12) United States Patent
Semaan

(10) Patent No.: US 6,850,483 B1
(45) Date of Patent: Feb. 1, 2005

(54) METHOD AND SYSTEM FOR PROTECTING FRAME RELAY TRAFFIC OVER SONET RINGS

(75) Inventor: Ghassan Semaan, Fremont, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/451,393

(22) Filed: Nov. 30, 1999

(51) Int. Cl.[7] .......................... G01R 31/08; H04L 12/26
(52) U.S. Cl. ..................... 370/218; 370/223; 370/241.1
(58) Field of Search ................ 370/218, 216, 370/217, 221, 222, 223, 224, 229, 231, 235, 236.2, 241, 241.1, 242, 248, 252, 245, 907, 400, 401, 404

(56) References Cited

U.S. PATENT DOCUMENTS

| | | | |
|---|---|---|---|
| 5,793,745 A | * | 8/1998 | Manchester ................. 370/224 |
| 5,838,924 A | * | 11/1998 | Anderson et al. ........... 709/239 |
| 6,005,694 A | * | 12/1999 | Liu ............................... 398/6 |
| 6,023,452 A | * | 2/2000 | Shiragaki ..................... 370/227 |
| 6,256,292 B1 | * | 7/2001 | Ellis et al. ................... 370/227 |
| 6,317,414 B1 | * | 11/2001 | Naohiro ....................... 370/222 |
| 6,359,857 B1 | * | 3/2002 | Ahmad et al. ............... 370/217 |
| 6,452,906 B1 | * | 9/2002 | Afferton et al. ............. 370/242 |
| 6,538,987 B1 | * | 3/2003 | Cedrone et al. ............. 370/216 |
| 6,657,952 B1 | * | 12/2003 | Shiragaki et al. ........... 370/223 |

* cited by examiner

Primary Examiner—Brian Nguyen
(74) Attorney, Agent, or Firm—Michael R. Cammarata; Chad J. Billings

(57) ABSTRACT

A frame relay (FR) protection method generates an OAM frame to other nodes upon detecting a defect on a SONET ring. The protection frame comprises a type of failure and a location of failure. A node that detected the defect transmits the protection frame to other nodes about the location of the failure and the type failure. Protection tables are provided for switching a working fiber link to a protection fiber link. A protection switching provides a method re-establish FR traffic in spite of a detected failure on a SONET ring.

6 Claims, 7 Drawing Sheets

FIG.8A

| ORIG. | WORKING DLCI | | | SWITCH CONNECTION | | | PROTECTION DLCI | | SWITCH CONNECTION | | |
|---|---|---|---|---|---|---|---|---|---|---|---|
| | DLCI # | STS # | DIR. | NODE # | DLCI # | STS # | DLCI # | STS # | NODE # | DLCI # | STS # |
| 1 | 239 | 3 | FIBER 1 | – | – | – | 240 | 2 | 5 | 312 | 5 |
| 1 | 410 | 1 | FIBER 1 | 2 | 25 | 5 | 411 | 5 | 6 | 312 | 5 |
| | | | | 3 | 663 | 4 | | | 5 | 419 | 6 |
| 2 | 210 | 4 | FIBER 2 | 1 | 315 | 2 | 211 | 5 | 3 | 510 | 2 |
| 6 | 119 | 8 | FIBER 1 | 1 | 318 | 5 | 120 | 8 | – | – | – |
| | | | | 3 | 98 | 10 | | | | | |

FIG.8B

| DEST. | WORKING DLCI | | | SWITCH CONNECTION | | | PROTECTION DLCI | | SWITCH CONNECTION | | |
|---|---|---|---|---|---|---|---|---|---|---|---|
| | DLCI # | STS # | DIR. | NODE # | DLCI # | STS # | DLCI # | STS # | NODE # | DLCI # | STS # |
| 2 | 423 | 5 | FIBER 1 | – | – | – | 424 | 2 | 3 | 567 | 5 |
| 1 | 450 | 1 | FIBER 1 | 3 | 25 | 7 | 452 | 5 | 5 | 332 | 1 |
| | | | | 2 | 225 | 4 | | | 6 | 734 | 9 |
| 5 | 210 | 4 | FIBER 2 | – | – | – | 211 | 5 | – | – | – |

METHOD AND SYSTEM FOR PROTECTING FRAME RELAY TRAFFIC OVER SONET RINGS

BACKGROUND INFORMATION

1. Field of the Invention

The invention relates to the field of telecommunications, and particularly to high-speed data transmission over fiber optic networks.

2. Description of Related Art

Synchronous Optical Network ("SONET") rings provide infrastructures for high capacity data transmission over fiber optic cables. Defects or failures on a SONET ring can occur in several places such as defects on a fiber or in equipment, or defects in processing a received signal. Traffics transmitted over a SONET ring include standard synchronous data (e.g., DS1, DS3), Asynchronous Transfer Mode (ATM), and various types of packets such as IP and Frame Relay (FR). ATM and standard synchronous connections provide end-to-end monitoring mechanisms which allow a transmitting node and a receiving node to monitor communication links. The monitoring functions of ATM and standard synchronous connections are capable of detecting defects, whether a defect occurred at a source, destination or intermediary node. If a protection or redundant fiber path is provided, protection switching is then made from the defected working fiber path to the protection fiber path to recover traffic.

However, such end-to-end monitoring mechanism is not available in FR. FR monitors a communication link connected directly between two nodes. FR provides no mechanism for monitoring a communication link where an intermediary node is placed between two end nodes. When a failure occurs at an intermediary node, FR traffic provides no notification of the defect to other nodes on a SONET ring.

Accordingly, it is desirable to have a protection method and system for recovering FR traffic when a failure occurs in a SONET ring.

SUMMARY OF THE INVENTION

The invention provides a protection frame for frame relay (FR) traffic which a node generates to inform other nodes about a defect detected on a SONET ring. The protection frame includes a type of defect and a location of defect. Upon receiving the protection frame, receiving nodes are informed as to the existence of the defect on the SONET ring. Protection tables are provided for switching a working fiber link to a protection fiber link. A protection switching provides a method to re-establish FR traffic in spite of a detected failure on a SONET ring.

Each node is associated with protection tables which specifies connections of received and transmitted data. The receiving protection table provides information to enable a node during decision-making in protecting received or dropped frame relay traffic. The transmitting protection table provides information to enable a node during decision-making in protecting transmitted or added frame relay traffic. Receiving and transmitting protection tables comprise a working Data Link Connection Identifier (DLCI) and a protection DLCI with a corresponding Synchronous Transport Signal (STS) number for each permanent virtual channel (PVC) or switched virtual channel (SVC).

BRIEF DESCRIPTION OF THE DRAWINGS

FIG 8A is a table diagram illustrating a protection table for dropped traffic of a node in accordance with the present invention; FIG. 8B is a table diagram illustrating a protection table for added traffic of a node in accordance with the present invention.

DETAILED DESCRIPTION OF PREFERRED EMBODIMENT

Figure 1:
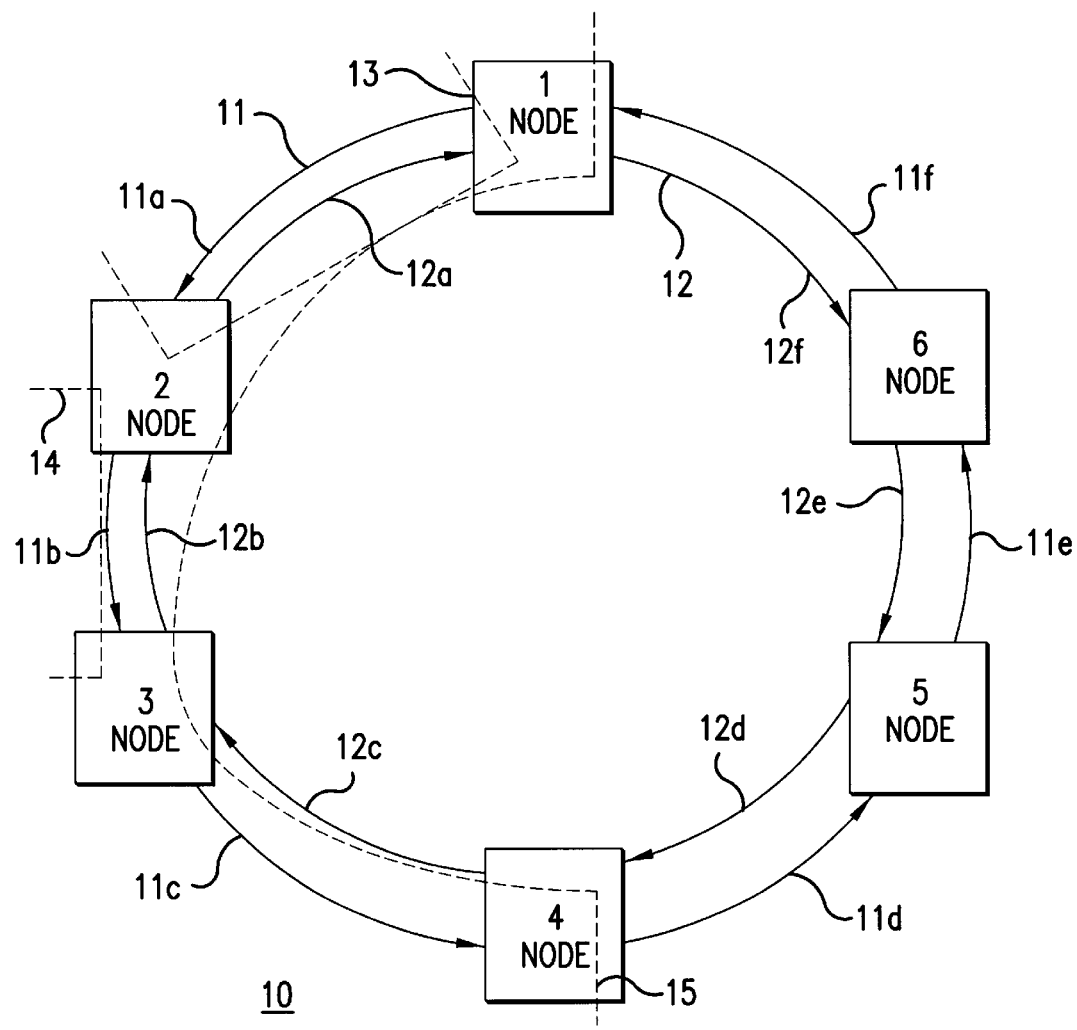
FIG. 1 is an architectural diagram illustrating a SONET ring in accordance with the present invention.

FIG. 1 is an architectural diagram of a SONET ring 10 for implementing a frame relay (FR) protection method. The SONET ring 10 includes nodes 1–6 a working fiber path 11, a protection fiber path 12, and FR virtual channels 13–15. Working fiber path 11 includes working fiber links 11a–f while protection fiber path 12 includes protection fiber links 12a–f. Working and protection fiber paths 11 and 12 form a pair of counter rotating fibers in which working fiber path 11 transmits in one direction while protection fiber path 12 transmits in the opposite direction. Optionally, additional rotating fibers can be added to SONET ring 10. For example, SONET ring 10 can be constructed with four rotating fibers, with two rotating fibers in each direction. Also, working and protection fibers paths 11 and 12 can be interchanged such that working fiber path 11 serves as a protection fiber and protection fiber path 12 serves as a working fiber.

Working fiber path 11 operates as a fiber cable for transmission of information between nodes 1–6. When a defect occurs in working fiber path 11, protection fiber path 12 operates as a backup channel for transmission and reception. More specifically, when a particular fiber link in working fiber links 11a–f is defective, FR traffic is transmitted through the protection fiber path 12 instead of working fiber path 11. Working fiber path 11 carries information required for communication between nodes 1–6. Such information is identified by Data Link Connection Identifier (DLCI) numbers and specified by Quality of Service (QoS). Protection fiber path 12 has the same characteristics and carries the same information as working fiber path 11, such as bandwidth size and QoS.

While working fiber links 11a–f are operational, protection fiber links 12a–f can also carry additional traffic, commonly referred to "extra traffic". When a defect is detected on links 11a–f, the additional traffic carried on links 12a–f is interrupted and links 12a–f are used to carry the traffic that was carried on links 11a–f. Alternatively, both working fiber path 11 and protection fiber path 12 carry data in which a receiver (not shown) determines whether data is transmitted on working fiber path 11 or protection fiber path 12.

Virtual channel 13, 14, or 15 is either a permanent virtual channel (PVC) or a switched virtual channel (SVC). Virtual channel 13 establishes a PVC or SVC connection between nodes 1 and 2. An example of virtual channel 13 is to establish a PVC connection between node 1 in Los Angeles and node 2 in New York. Moreover, virtual channel 14 constructs a PVC or SVC connection between nodes 2 and 3, while virtual channel 15 provides a PVC or SVC connection between nodes 1, 2, 3, and 4.

Figure 2:
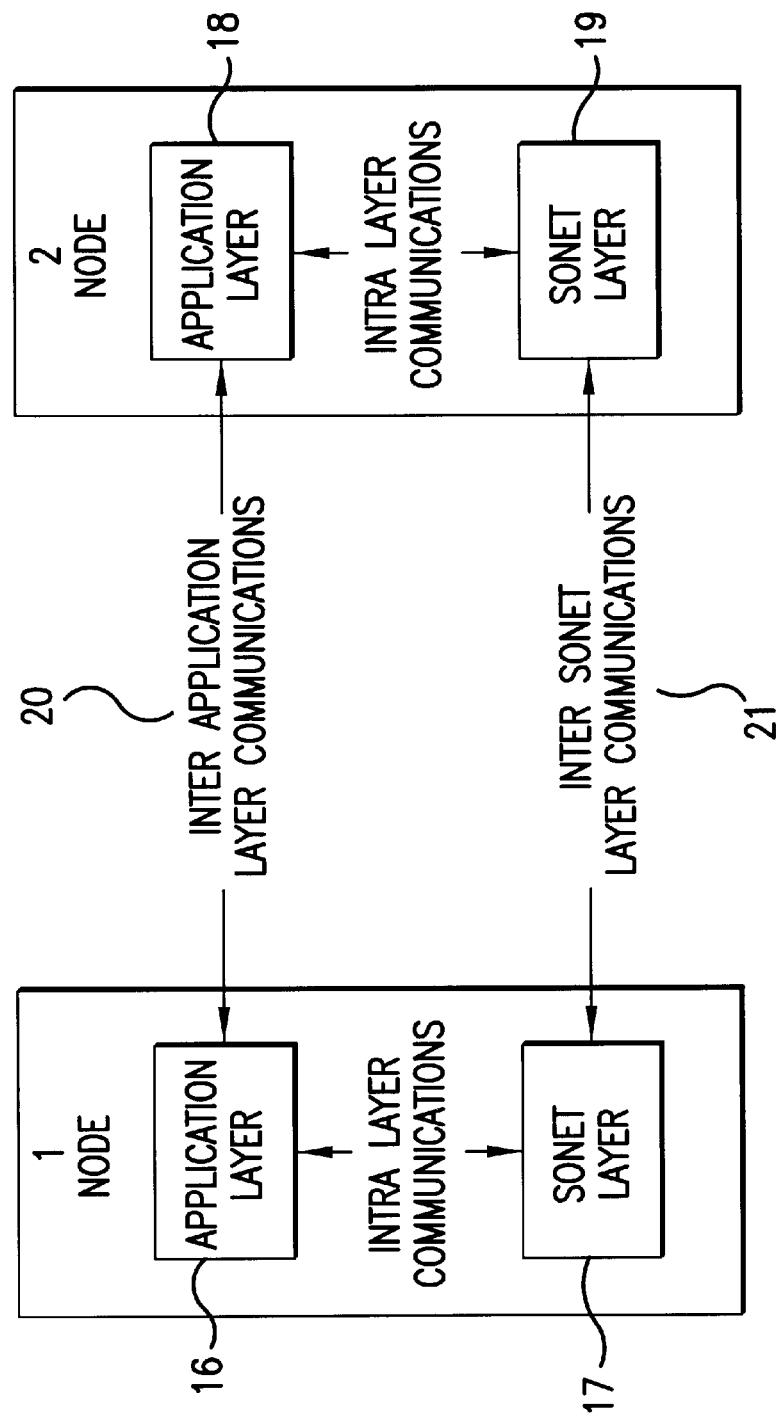
FIG. 2 is an architectural diagram illustrating intra and inter layers communications in accordance with the present invention.

FIG. 2 shows an architectural diagram of intra and inter layers communications, which defines two main layers: a SONET layer and an application layer. A SONET layer carries communications related to SONET signals, such as processing a SONET frame overhead and detecting defects, and covers requirements related to the Section, Line and STS Path layers. A SONET layer comprises features defined in the latest release of Bellcore GR-253-CORE as well as any additional features that might be added in future releases. An application layer carries functional operations related to an application carried by a SONET signal, and covers any application that is using SONET layers to transmit data between two nodes.

Within node 1, the intra-layer communication occurs between an application layer 16 and a SONET layer 17. In node 2, the intra layer communication occurs between an application layer 18 and a SONET layer 19. Between node 1 and node 2, a channel 20 exists between application layer 16 and application layer 18 for inter application layer communications, and a channel 21 exists between SONET layer 17 and SONET layer 19 for inter SONET layer communications.

FR protection switching application 24 is part of application layer 16 and application layer 18. Channel 20 provides inter application layer communications for exchanging data and control FR messages. The FR protection switching application 24 uses control messages to propagate protection switching messages and coordinate protection switching between two nodes. If node 1 detects a defect on SONET layer 17, SONET layer 17 informs application layer 16 that a defect has occurred. FR protection switching application 24 exchanges a protection switching—operation, administration and maintenance (PS-OAM) frame 68 with other nodes to coordinate a protection switch. PS-OAM frame 68 is a type of FR OAM frame. PS-OAM frame 68 includes a type of defect and identifies which one of protection fiber links 11a–f is affected by the defect. The inter SONET layer communications between nodes 1–2 operate according to standards as set forth by Bellcore.

Figure 3:
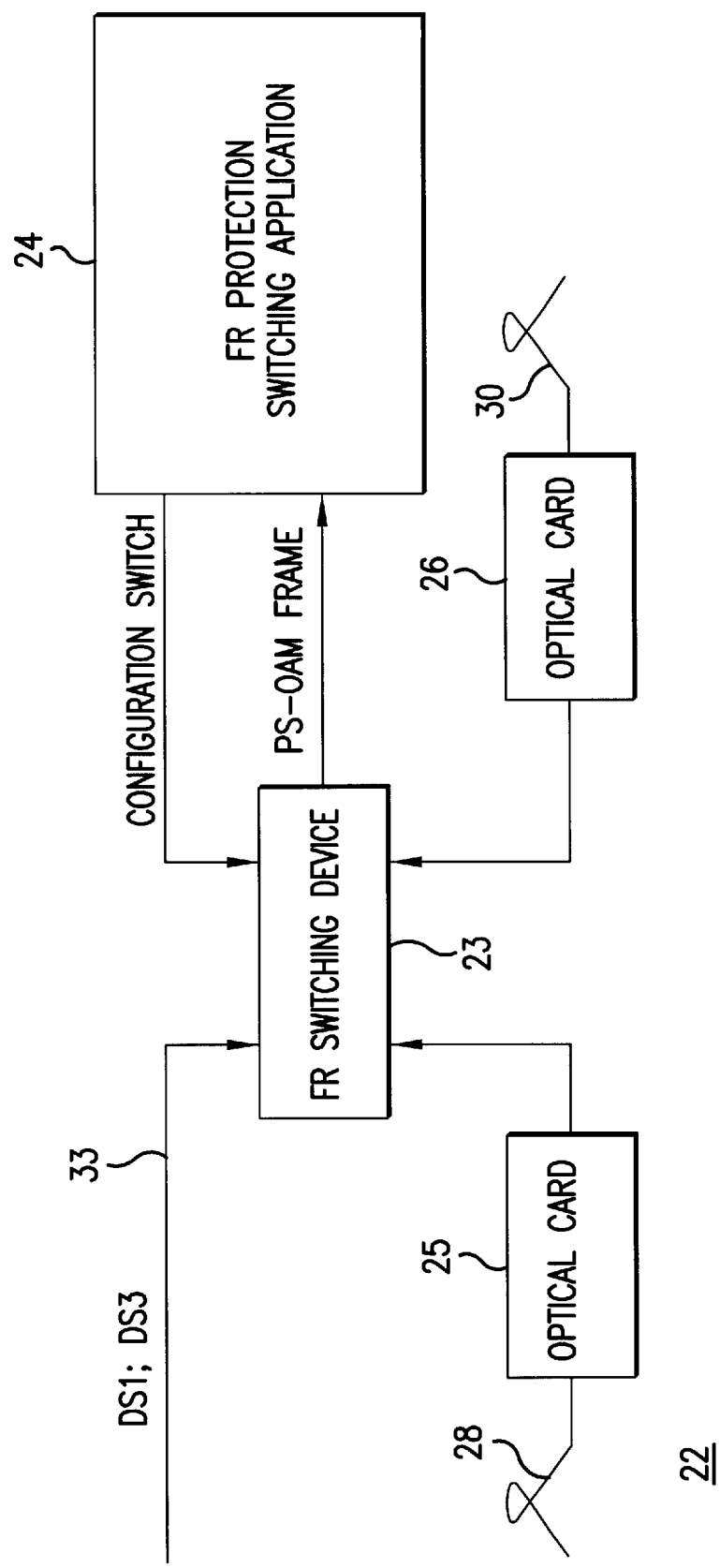
FIG. 3 is a node block diagram of a frame relay protection method in accordance with the present invention.

FIG. 3 is a node block diagram 22 of a FR protection method in SONET ring 10, including a FR switching device 23, a protection switching application 24, an optical card 25, and an optical card 26. FR switching device 23 receives FR frames through optical card 25 or optical card 26. Optical card 25 receives a SONET frame from a fiber line 28 at an OC-N (optical carrier-Nth level) bit date. The SONET frame carries FR traffic. Optical card 26 receives a SONET frame from a fiber line 30 at an OC-N bit rate. FR switching device 23 is implemented, for example, in an application specific integrated circuit or as a central processing unit. When FR switching device 23 receives PS-OAM frame 68, FR switching device 23 switches PS-OAM frame 68 to FR protection switching application 24. Protection switching application 24 including both a dropped table 80 and an added table 81 for configuring a switch from a defect specified in PS-OAM frame 68. After configuration, FR switching device 23 may add or drop communication over optical card 25 or optical card 26. FR switching device 23 receives customer data from any type of tributary cards (e.g. DS1 or DS3) on a line 33 for transmission through optical card 25 or optical card 26.

Figure 4:
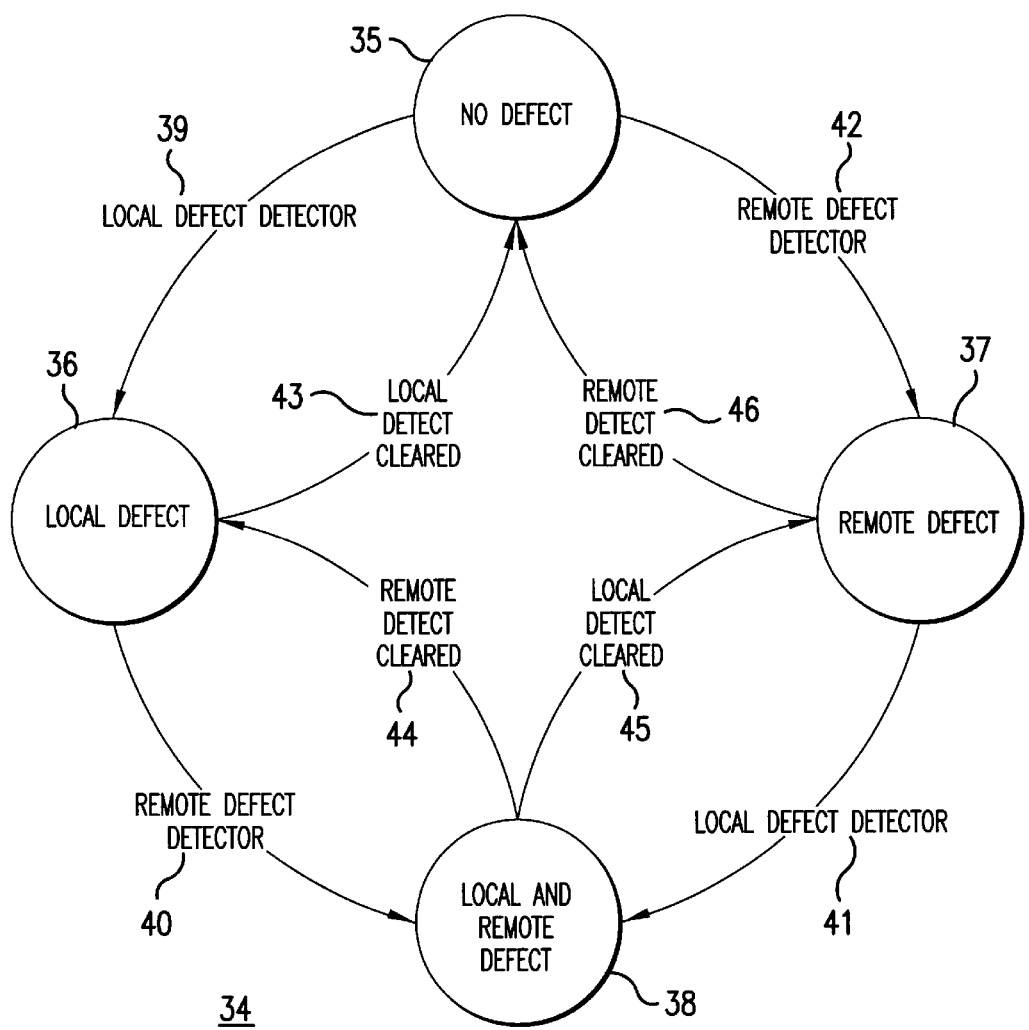
FIG. 4 is a state diagram illustrating the frame relay protection method of a node on a SONET ring in accordance with the present invention.

FIG. 4 is a state diagram 34 of a node in FR protection method 47. Each of nodes 1–6 operates in one of the four states, a no defect state 35, a local defect state 36, a remote defect state 37, and local and remote defects state 38. For illustration, the description refers to node 4, although state diagram 34 is applicable to nodes 1–3, and 5–6.

While fully operational, node 4 remains in a no defect state 35. When a local defect has been detected 39, node 4 changes to a local defect state 36. Moreover, if a remote defect has been detected 40, node 4 changes to local and remote defects state 38. Conversely, if node 4 initially detects 42 a remote defect, node 4 changes to a remote defect state 37. Furthermore, if a local defect is detected 41, node 4 changes to the local and remote defects state 38. There are four possible events in triggering the clearance of a local, remote, or local and remote defects between the four states of the no-defect 43, the local defect 44, the remote defect 45, and the local and remote defects 46. At the local defect state 35, if a local defect is cleared 43, node 4 changes to the no defect state 45. At the remote defect state 37, if a remote defect is cleared 46, node 4 changes to the no defect state 35. At local and remote defects state 38, if a remote defect is cleared 44, node 4 changes to the local defect state 36. At the local and remote defects state 38, if a local defect is cleared 45, node 4 changes to the remote defect state 37.

In the no defect state 35, node 4 remains in this state when no local or remote defect is detected. FR traffic is sent as specified by protection tables 80 and 81. Each of nodes 1–6 continues to monitor for a local defect, as well as monitoring received traffic for PS-OAM frame 68 declaring a remote defect.

In local defect state 36, node 4 enters this state where a local defect but no remote defect is detected. Node 4 generates and transmits PS-OAM frame 68 on links 11a–f on working fiber path 11 and 12a–f on protection fiber path 12. PS-OAM frame 68 includes information which informs the remaining nodes, such as nodes 1–3 and 5–6, on SONET ring 10 about the detection of the defect. Consequently, a protection switch from the defected working fiber path 11 to the protection fiber path 12 may be initiated by one or more nodes on SONET ring 10.

In remote defect state 37, nodes 4 enters the remote defect state when a remote defect is detected while no local defect is detected. Remote defects are detected by the reception of a PS-OAM frame. Node 4 in the remote defect state processes the received PS-OAM frame 68, and forwards PS-OAM frame 68 to the next node in the ring, e.g. node 5. Based on the type of defect, the location of the defect, and protection tables 80 and 81, node 4 selects PVCs that are affected by the defect. For PVCs that are affected by the defect, node 4 starts to drop traffic from working fiber path 11 to protection fiber path 12. For PVCs that are not affected by the defect, node 4 continues to add or drop traffic on working fiber path 11.

In local and remote defects state 60, both a local defect and a remote defect are detected by node 4. Node 4 detects a local defect in a received signal or in the received circuit (not shown) which prevents node 4 from reading traffic from nodes 1–4 in the upstream. The local defect is cleared 45 when node 4 detects the clearance of the defect. The remote defect is detected 40 when node 4 receives PS-OAM frame 68 from nodes 1, 2, or 3 in the upstream. Node 1, 2, or 3 in the upstream transmits PS-OAM frame 68 to node 4 in the downstream that a defect was detected. The remote defect is cleared 44 when node 4 detects a subsequent clearance of the defect. The clearance of a remote defect is detected by the non-reception of PS-OAM frame 68 for n consecutive seconds. In one embodiment, the n consecutive seconds is set to 3 consecutive seconds. Another option would be to send a PS-OAM frame that inform the remaining nodes that the defects has been cleared.

Figure 5:
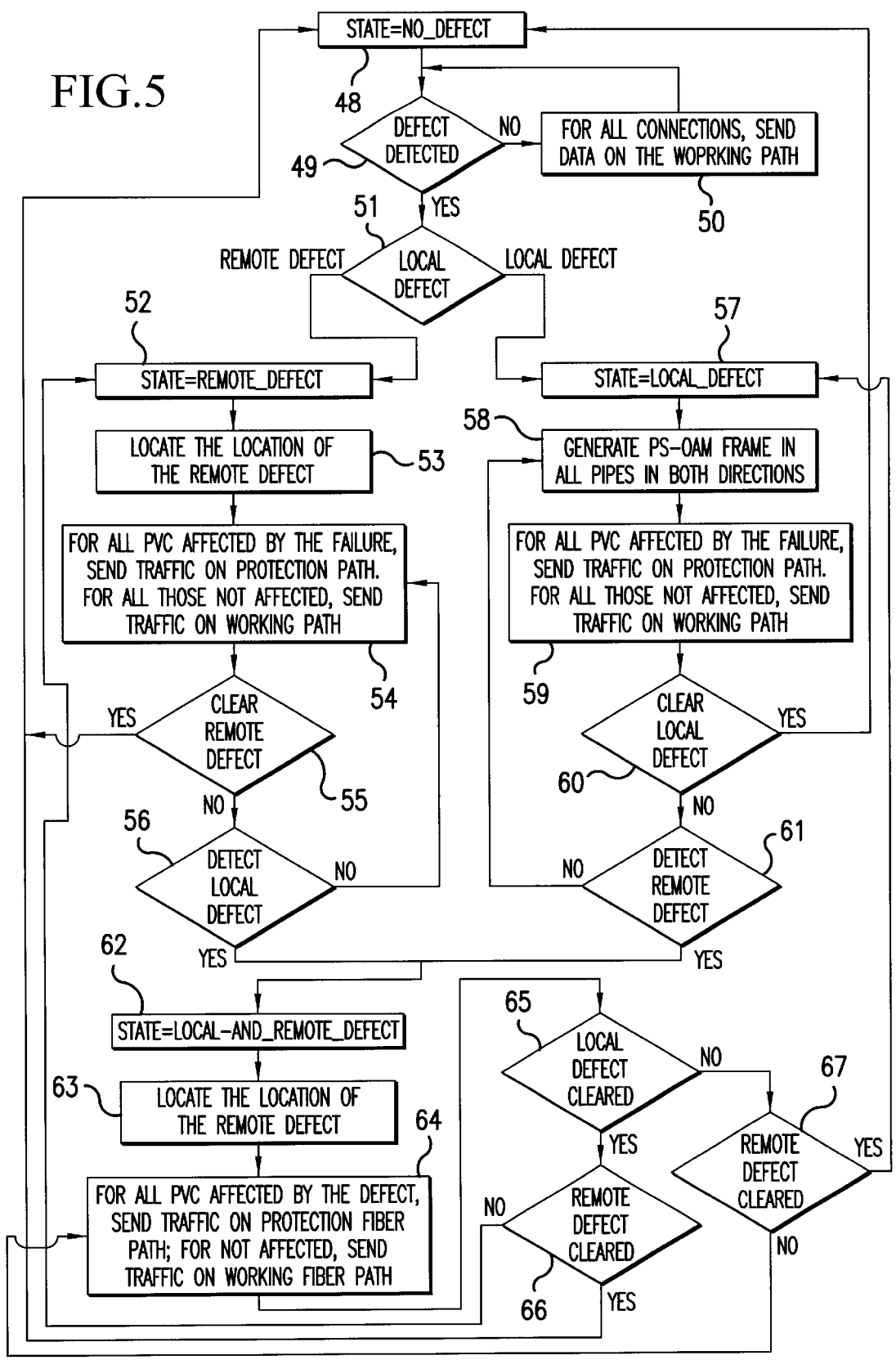
FIG. 5 is a flow chart illustrating a frame relay protection method of a node on a SONET ring in accordance with the present invention.

FIG. 5 is a flow diagram of a FR protection method 47 of node 4 on SONET ring 10. Although node 4 is referred to in this diagram, the description is applicable to nodes 1–3, and 5–6. When SONET ring 10 is operational, node 4 starts 48 in a no-defect state. Node 4 monitors activities on SONET ring 10 to detect a defect or failure. If no defect is detected, node 4 sends 50 traffic on working fiber path 11 for all connections. However, if node 4 detects a defect, node 4 determines 51 whether the detected defect is a local defect or a remote defect.

When the detected defect is a remote defect, node 4 changes 52 to a remote defect state. Subsequently, node 4 locates 53 the location of the remote defect. For all PVC affected by the defect, node 4 sends 54 traffic on protection fiber path 12 rather than working fiber path 11. For PVCs that are not affected, node 4 continues to send traffic on working fiber path 11. Traffic includes various types of information and formats such as data, voice, and video. The process returns 55 to the initial state of no defect if node 4 clears 55 the remote defect. If the remote defect is not cleared, node 4 keep monitoring 56 for a local defect.

When a detected failure is a local defect, node 4 sets 57 to a local defect state. Upon detecting a local defect, node 4 generates 58 PS-OAM frame 68 in links 11a–f and 12a–f in both directions for informing nodes 1–3 and 5–6 about the detected defect. For all PVC affected by the defect, node 4 sends 59 traffic on protection fiber path 12. For PVC not affected, node 4 transmits traffic on working fiber path 11. Subsequently, if the local defect has been cleared 60, node 4 returns 48 to the no defect state. If the local defect remains, node 4 monitors 61 for a remote defect. If no remote defect is detected 61, the process returns 58 for generating PS-OAM frame 68 in links 11a–f and 12a–f in both directions.

When both a local defect and remote defect are detected simultaneously, the process moves to an operation 62. Node 4 sets 62 to local and remote defects state. Node 4 detects 63 for the location of the remote defect. For all PVC affected by the detected failure, node 4 sends 64 traffic on the protection fiber path 12. For all PVC not affected by the detected failure, node 4 transmits traffic 64 on the working fiber path 12. Node 4 determines 65 whether the local defect has been cleared. If the local defect has been cleared, node 4 then determines 66 if the remote defect has been cleared. If the remote defect has cleared, the process returns 48 to the initial state of no defect. However, if the remote defect has not been cleared 66, node 4 sets 52 to a remote defect state. If the local defect has not been cleared 65, then node 4 determines 67 if the remote defect has cleared. If the remote defect has not been cleared, then the process moves to operation 64. If the remote defect has been cleared 67, then node 4 sets 57 to a local defect state.

Figures 6, 7:
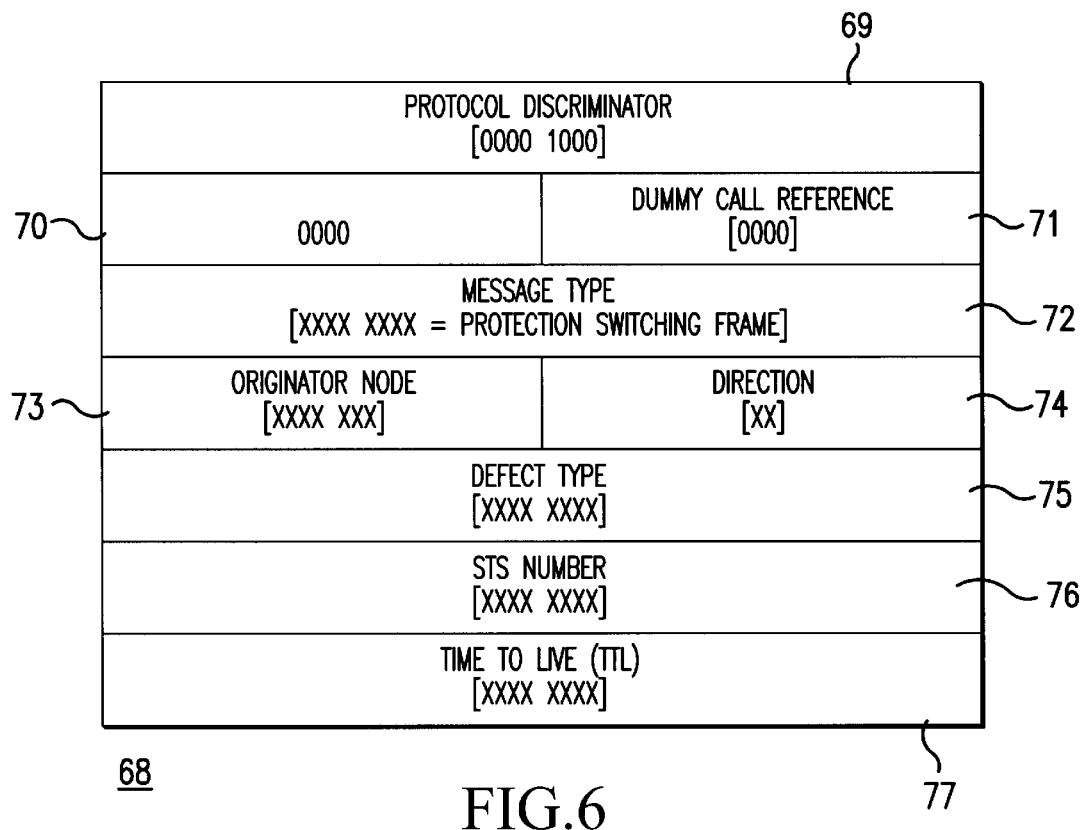
FIG. 6 is a frame diagram illustrating a PS-OAM frame for frame relay protection in accordance with the present invention.
FIG. 7 is a table diagram illustrating a topology table of a node in accordance with the present invention.

FIG. 6 is a table structure of FR PS-OAM frame 68. PS-OAM frame 68 includes seven bytes of data. The first three bytes of PS-OAM frame 68 are standard bytes which are common to all FR OAM frames. The third byte, i.e., a message type 72, indicates types of information received in bytes four through seven. A protocol discriminator segment 69 occupies one byte and is set to a binary value of "00001000". Protocol discriminator 69 provides default parameters for PS-OAM frame 68 in FR traffic. A dummy call reference 71 is 4-bit in width and sets to "0000". The other four bits 70 that are adjacent to dummy call reference 71 are set to "0000". A message type segment 72 occupies one byte and indicates the type of message received. The message type segment 72 is used to differentiate between different FR OAM frames. The protection switching frame in message type 72 is introduced as a particular type of OAM frame for FR protection. An originator node segment 73 and a direction segment 74 compose the next byte. Originator node segment 73 is 6-bit in width and identifies a node in which PS-OAM frame 68 originated. Direction segment 74 is 2-bit in width and identifies the flow direction of a defected fiber. Direction segment 74 specifies transmission and reception of traffic through working fiber path 11 or protection fiber path 12. A defect type segment 75 includes one byte and identified a type of defect detected. A STS number segment 76 is 8-bit in width and represents the number of the STS in the SONET frame affected by the defect. If values of all 8-bit are binary ones, then the STS number indicates that all STSs were affected. A TTL segment 77 indicates the number of hops in which PS-OAM frame 68 is processed through before PS-OAM frame 68 is dropped from SONET ring 10. TTL segment 77 is 8-bit in width and sets a limitation on the number of times in relaying PS-OAM frame 68 around SONET ring 10. When PS-OAM frame 68 passes through each node, TTL segment 77 decrements by one. At such time, when a node decrements the value to zero, that node removes PS-OAM frame 68 from SONET ring 10.

FIG. 7 is a topology table 78 at node 4. Topology table 78 provides the identification (ID) of nodes 1–3 and 5–6 as well as the topology in which nodes 1–6 are connected. At node 4, working fiber path 11 is constructed with a node order of 4→5→6→1→2→3. Protection fiber path 12 is constructed with a node order of 4→3→2→1→6→5. Each of the nodes 1–3 and 5–6 also has a similar topology table. One skilled in the art should recognize that the number of nodes and the node order can be selected according to a particular design.

Each node is associated with a protection table for dropped traffic and a protection table for added traffic. As shown in FIG. 8A–B, node 4 has protection table 80 for dropped or received traffic and protection table 81 for added or transmitted traffic. Protection tables 80 and 81 have four main segments, a working data link connection identifier 82, a switch connection 83, a protection DLCI 84, and a switch connection 84. When node 4 is functional, node 4 operates in accordance with working DLCI 82 and switch connection 84. However, if node 4 detects a defect, operations on PVC or SVC connections of node 4 are determined by protection DLCI 84 and switch connection 85.

Working DLCI 84 includes a DLCI number 86, a STS number 87, and a direction 88. DLCI number 86 represents the DLCI that identifies the working connection. Working STS number 87 identifies the STS for carrying traffic on the working fiber path 11. Working direction 88 depends on whether the DLCI is received or transmitted from a fiber 1, i.e. working fiber path 11, or a fiber 2, i.e. protection fiber path 12, of SONET ring 10. Protection DLCI 84 includes a DLCI number 89 and a protection STS number 90. Protection DLCI number 89 is the DLCI that identifies a protection connection on protection fiber path 12. Protection STS number 90 is a number that identifies the STS in a SONET frame used to carry traffic on protection fiber path 12.

For example, in the first row of protection table 80 for dropped traffic, nodes 4 receives traffic on STS number 3 of fiber 1 with DLCI number 239 from node 1. There are no intermediate nodes to switch this traffic. If a defect occurs, the protection path of fiber 2 is sent in STS#2 with DLCI#240, and then switched by node 5 to STS#5 with DLCI#312.

Optionally, additional columns of information can be incorporated to protection tables 80 and 81. For example, a column can be added to protection tables 80 and 81 that provides an identification as to whether the working or protection fiber connection is active, or whether the connection is in unidirectional or bidirectional mode. Additionally, a column can be added to protection tables 80 and 81 on whether the protection is in revert or non-revertive mode. More specifically, in a revertive mode, after a defect or failure has been cleared, nodes 1–6 in SONET ring 10 returns to the initial configuration. The initial configuration is the configuration before the protection occurs. In the non-revertive mode, nodes 1–6 in SONET ring 10 remains in the current configuration after the defect or failure clears.

The above embodiments are only illustrative of the principles of this invention and are not intended to limit the invention to the particular embodiments described. For example, one skilled in the art should recognize the term PS-OAM is a selected name in which a technical standard or committee can designate by a different name, but the purpose of the OAM frame 68 is the same. Moreover, a protection frame can be constructed for various types of traffic indicating that a defect has occurred on a line, including twisted pair wires, coaxial cables, and fiber cables. Furthermore, although node 4 is illustrated in the description above, the present method and system are applicable to nodes 1–3 and 5–6. Accordingly, various modifications, adaptations, and combinations of various features of the described embodiments can be practiced without departing from the scope of the invention as set forth in the appended claims.

I claim:

1. A method for protecting frame relay traffic on a SONET ring, comprising the steps of:
    detecting a defect during the frame relay traffic on a working fiber path on the SONET ring by a first of a plurality of nodes, said detecting a defect including determining whether the defect is a remote defect, a local defect, or both;
    generating an operation, administration, and maintenance (OAM) frame from the first node, the OAM frame including a type of the defect and a location of the defect on the SONET ring;
    transmitting the OAM frame from the first node to each of the plurality of nodes on the SONET ring, the OAM frame indicating to each of the plurality of nodes the detected defect on the working fiber path; and
    switching the working fiber path to a protection fiber path at the location between each of the plurality of nodes where a defect is detected.

2. The method of claim 1, further comprising the steps of transmitting the frame relay traffic on the protection fiber path where the defect occurred.

3. A method of protecting frame relay traffic on a SONET ring having at least a first node and a second node amongst a plurality of nodes, comprising the steps of:
    detecting a defect on a working fiber path on the SONET ring by the first node, said detecting a defect including determining whether the defect is a remote defect, a local defect, or both;
    creating an operation, administration, and maintenance (OAM) frame based on the detected defect at the first node;
    transmitting the operation, administration and maintenance (OAM) to the plurality of nodes including the second node;
    receiving the operation, administration, and maintenance (OAM) frame from the first node at the second node, the OAM frame including the location and type of defect detected at the working fiber path; and
    switching from the working fiber path where the defect is detected to a protection fiber path.

4. The method of claim 3, further comprising the steps of transmitting the frame relay traffic on the protection fiber path where the defect occurred.

5. A system for protecting frame relay traffic on a SONET ring having a plurality of nodes, the plurality of nodes comprising:
    a working fiber path having a plurality of working fiber links on the SONET ring; and
    a first node detecting a defect in a first working fiber link in the plurality of working fiber links and generating a protection frame, said detecting a defect including determining whether the defect is a remote defect, a local defect, or both and the protection frame including a type of the defect and a location of the defect;
    the first node transmitting the protection frame to each of the other nodes in the plurality of nodes on the SONET ring, the protection frame informing the other nodes about the location and type of the defect that occurred at the working fiber path.

6. The system of claim 5, further comprising a protection fiber path on the SONET ring, frame relay traffic transmitted on the protection fiber path rather than the working fiber path.

* * * * *